Figure 1:
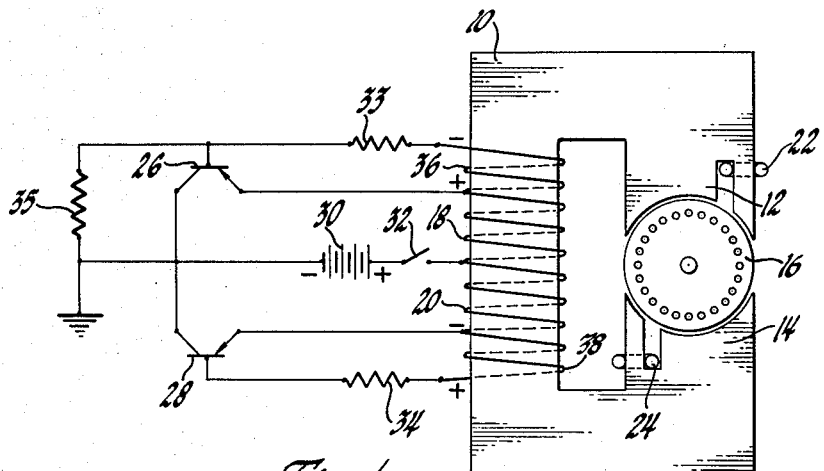

Feb. 23, 1965     S. E. ADAIR     3,171,072
MOTOR ENERGIZING CIRCUIT
Filed Nov. 21, 1960     2 Sheets-Sheet 1

INVENTOR.
Samuel E. Adair
BY
Paul J. Ethington
ATTORNEY

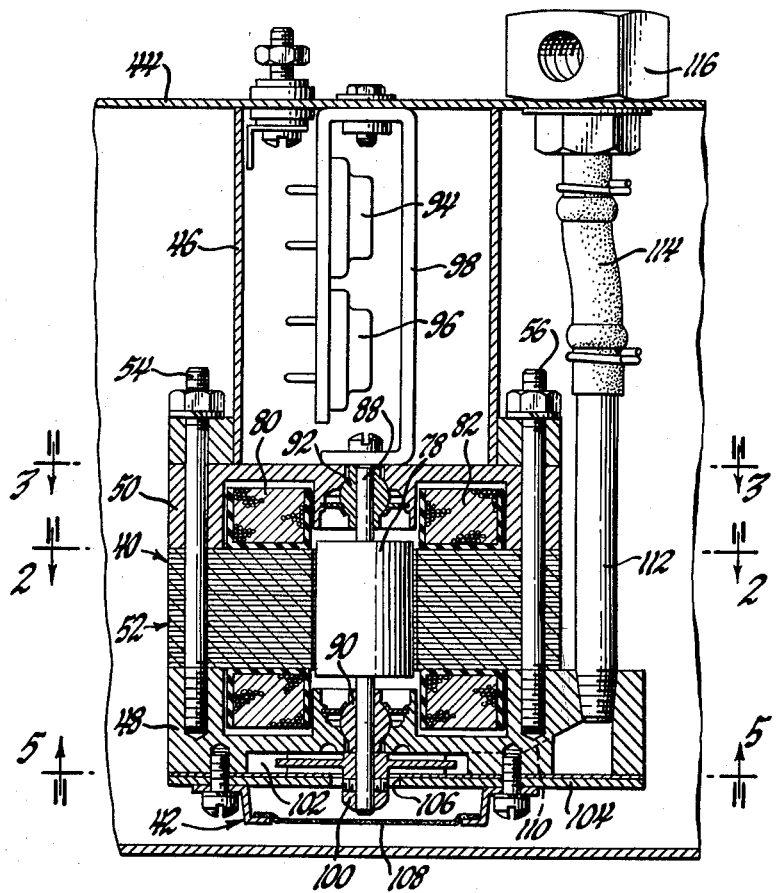
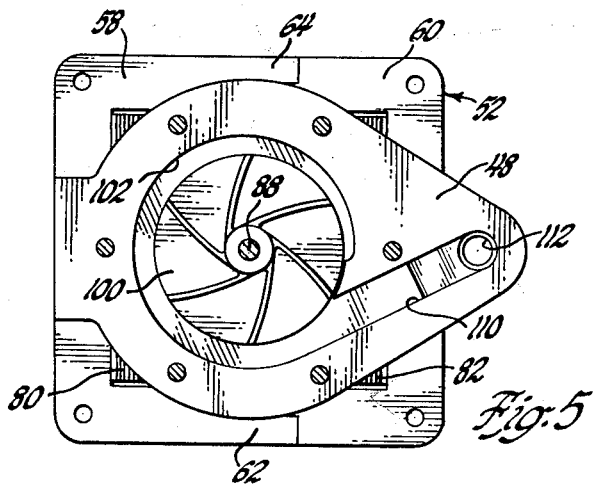
INVENTOR.
Samuel E. Adair
BY
Paul J. Ethington
ATTORNEY

United States Patent Office 3,171,072
Patented Feb. 23, 1965

3,171,072
MOTOR ENERGIZING CIRCUIT
Samuel E. Adair, Shorewood, Wis., assignor to General Motors Corporation, Detroit, Mich., a corporation of Delaware
Filed Nov. 21, 1960, Ser. No. 70,506
6 Claims. (Cl. 318—138)

This invention relates to electric motors and more particularly to an improved circuit for energizing an alternating current motor from a direct current source.

In many motor applications where only a direct current source is available, it is desirable to employ a motor without brushes or other switching contacts. The brushes of conventional direct current motors have a relatively short operating life and require considerable maintenance to ensure reliability of the motor. In some applications, the electrical noise generated by the switching transients is objectionable because of interference with radio or other electronic equipment. In other applications, the electrical arcing of the brushes may constitute a hazard, as in the case of a submersible fuel pump for use in automobiles and the like.

I have found that an alternating current motor can be energized from a direct current source by connection of a specially connected motor field coil through a pair of transistors to form a self-excited oscillator in which the transistors are operated in a switching mode. Transistor inverter circuits using an oscillator for converting a direct voltage to an alternating voltage are well known and, in the most common forms, a transformer is employed to connect the transistor electrodes in feedback relationship to sustain oscillations and to couple the oscillator output circuit to the load. Such an inverter circuit could be used for energizing an alternating current motor by coupling the transformer secondary winding to the field coil but this requires a transformer with the same power capacity as the motor itself.

In accordance with this invention, the transformer is dispensed with and the transistors are coupled through their output electrodes directly with respective coils of a split field winding which produces an alternating magnetomotive force in the magnetic circuit of the motor. Feedback windings, inductively coupled with the field coils, are connected to the input electrodes in a regenerative fashion to cause alternate conduction of the transistors by supplying switching voltages of reversible polarity. The polarity reversal in the switching voltage is preferably accomplished by proportioning the circuit parameters so that the magnetic flux which couples the feedback windings and the field coils approaches a limiting value during each half-cycle of the magnetomotive force. I prefer to precipitate the switching action by driving the conductive transistor into its collector current saturation region while operating the magnetic circuit of the field coils below the knee of its magnetization curve. When the collector current reaches saturation and stops increasing, the feedback voltages will decrease causing the collector current of the conductive transistor to decrease, so the magnetic flux in the motor core will reverse direction and induce a feedback voltage of the opposite polarity in the feedback windings.

In such an arrangement, the switching of the transistors is dependent primarily upon static elements in the circuit with the consequent advantage that electrical oscillation and voltage inversion is achieved with the rotor at a standstill. Thus, with alternating voltage applied to the motor field coils, starting torque may be provided by the conventional arrangements used in alternating current motors.

Figure 2:
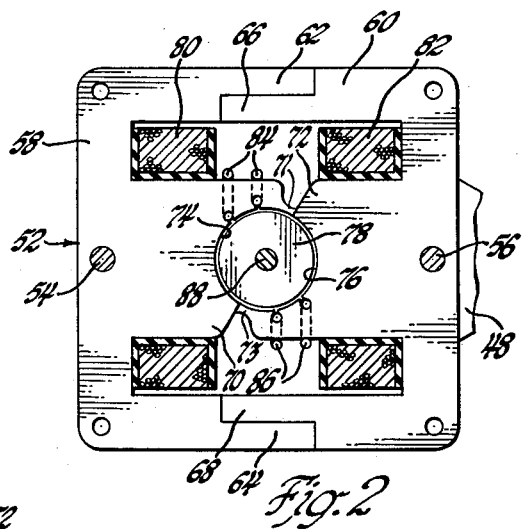
Figure 3:
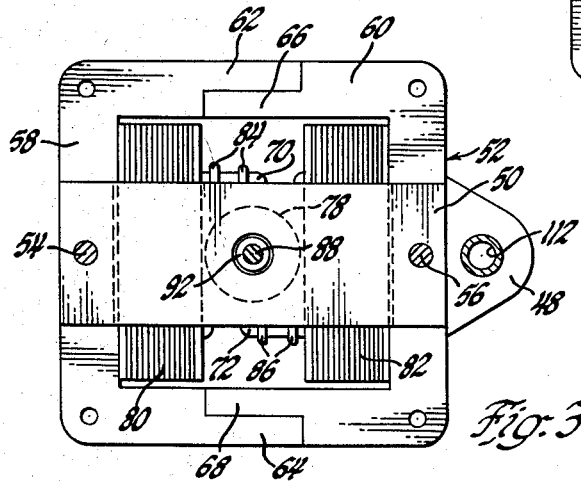

A more complete understanding of this invention may be had from the detailed description which follows taken with the accompanying drawings in which:

FIGURE 1 is a schematic diagram of the inventive motor and energizing circuit;
FIGURE 2 shows a section of the motor taken on lines 2—2 of FIGURE 4;
FIGURE 3 is a sectional view taken on lines 3—3 of FIGURE 4;
FIGURE 4 shows an illustrative embodiment of the inventive motor and energizing circuit in a submersible fuel pump; and
FIGURE 5 is a sectional view of the motor taken on lines 5—5 of FIGURE 4.

Referring now to the drawings, there is shown in FIGURE 1 an illustrative embodiment of the invention in an alternating current motor for energization from a direct voltage source through a pair of transistors operated as switches. The motor is a single phase, shaded pole induction motor with a stator field core 10 having a pair of oppositely disposed pole pieces 12 and 14 with a squirrel cage rotor 16 rotatably mounted therebetween. In order to energize the magnetic circuit of the motor with an alternating magnetomotive force, a pair of field coils 18 and 20 are provided on the stator core. The field coils 18 and 20 are joined at a common terminal and are normally wound with the same number of turns. The coil 18 is wound in the same direction, between its end terminal and the common terminal, as is coil 20, between the common terminal and its end terminal. To provide starting torque, shading coils 22 and 24 are disposed upon the leading edges of the pole pieces 12 and 14, respectively, in a conventional manner. A pair of transistors 26 and 28 are connected with the field coils 18 and 20 in push-pull fashion and are energized from a direct voltage source, such as a battery 30 having its negative terminal connected to a point of reference potential or ground and having its positive terminal connected to a starting switch 32. The transistor 26 has its output circuit extending between its emitter and collector electrodes through field coil 18 and the battery 30. Similarly, transistor 28 has its output circuit extending between its emitter and collector electrodes through the field coil 20 and through the battery 30. The input circuits of the transistors 26 and 28 extend between their respective emitter and base electrodes through limiting resistors 33 and 34 and feedback coils 36 and 38 respectively. In order to provide a starting bias voltage for the input circuits, a resistor 35 is connected between ground and the base electrode of transistor 26. Switching voltages for the transistor input circuits are developed by the feedback coils 36 and 38 which are inductively coupled with the field coils. The switching voltages are applied to the respective base electrodes in series with the limiting resistors 33 and 34 to obtain improved stability of operation.

The transistors 26 and 28 are PNP type, power transistors but, of course, NPN type transistors may be employed with a suitable reversal of polarities. With the transistors operated in the switching mode, they behave essentially as on-off switches and the collector circuits are rendered "open" or "closed" by means of the emitter to base voltage. In considering transistor switching operation, it is convenient to divide the transistor collector characteristic curves of collector current as a function of collector voltage into "cut-off," "active," and "saturation" regions. The "cut-off" region is a stable or quiescent region of operation and is obtained with a base current of zero so that only collector leakage current flows and it is of negligible value. The "saturation" region is also stable and is characterized by operation wherein an increase in the base current will not produce any appreciable increase in collector current. Between these two extremes is the "active" or "transition" region wherein the transistor provides normal or substantially linear amplifier gain. With the transistor in a state of collector current saturation, the collector voltage is at a low value and with it in a state of cut-off the current is at a low value so that power dissipation is low in both conditions. In the switching mode of operation, the transition period between cut-off and saturation is of such short duration that large amounts of power may be switched without causing the average dissipated power to exceed the acceptable maximum rating for the transistor.

In order to operate the transistors 26 and 28 in the switching mode, the feedback voltage is caused to reverse its polarity abruptly during each switching interval. This is preferably accomplished by causing the magnetic flux which couples the field winding to the feedback winding to approach a limiting value by operating one of the circuit elements into a region of saturation during each switching interval. In some applications, it may be desirable to proportion a selected part of the magnetic circuit for saturation within the operating range of magnetizing current so that switching is precipitated, after the collector current first reaches saturation, by saturation of the magnetic circuit. However, in the embodiment described herein, the switching action is precipitated by the occurrence of collector current saturation of the transistors while the magnetic circuit of the motor is operated below the knee of its magnetization curve.

When the starting switch 32 is closed, a bias voltage is applied to the base electrode of transistor 26 through resistor 35. This will cause the conduction of transistor 26 to predominate and the current through the field coil 18 will increase and cause a voltage of the polarity indicated to be induced in the feedback coils 36 and 38. This feedback voltage will cause the base of transistor 26 to become more negative and the base of transistor 28 to become more positive. Consequently, the collector current of transistor 26 will increase rapidly until the collector current reaches a saturation value and at the same time the transistor 28 is biased to cut-off. Since full battery voltage is applied across the field winding 18, the flux increases substantially linearly with time and the feedback voltage is of substantially constant value. With a constant feedback voltage applied to the base electrode of transistor 26, the collector current will attain a maximum value as determined by base current and the magnetic flux will stop increasing and, accordingly, the feedback voltage will decrease to zero. This reduces the conduction of transistor 26 and the magnetic field begins to collapse which reverses the polarity of the feedback voltage of the coil 36 and transistor 26 is thereby cut-off. At the same time, the polarity of feedback voltage of coil 38 is reversed and the transistor 28 is turned on and is driven to collector current saturation in the same manner as that just described for the transistor 26. Upon the collapse of the magnetic field, the feedback voltage again reverses in polarity and transistor 28 is cut off and transistor 26 is again turned on. This oscillatory switching action is maintained at a frequency determined by the number of motor field windings, the voltage of the battery, the saturation current of the transistors, the flux magnitude of the iron at transistor saturation, and rotor and shading coil parameters. Consequently, the battery is alternately connected across the field coils 18 and 20 and an alternating flux is produced in the magnetic circuit of the motor.

In the system just described, the motor circuit is energized by closing the starting switch 32 which causes the transistors 26 and 28 to become alternately conductive through the respective field coils 18 and 20 and an alternating magnetic flux is produced in the magnetic circuit including the core 10, the air gap, and the rotor 16. The pole pieces 12 and 14 are provided respectively with shading coils 22 and 24 which operate to impose a time delay on the component of field flux through the leading pole tips. This component of field flux is displaced in space and time from the main component of field flux and produces a starting torque upon the rotor 16. Thus, the rotor can be brought up to operating speed under load as in the case of the conventional single phase, shaded pole induction motor. It will now be apparent that the energizing circuit is applicable to single phase alternating current motors with other starting arrangements, such as the split phase, capacitor start or other well known expedients. Additionally, it will be apparent that a polyphase motor may be energized from a plurality of oscillator circuits which are appropriately synchronized.

Referring now to FIGURES 2, 3, 4, and 5, there is shown a particular embodiment of the invention in a single phase, shaded pole induction motor useful for driving a submersible fuel pump of the type adapted for automotive use. As shown in FIGURE 4, this embodiment comprises a motor 40 with a centrifugal fuel pump 42 supported from the upper wall of the fuel tank 44 by a support bracket 98 which is contained within a cylindrical shield 46. The motor 40 comprises a pair of rectangular end plates 48 and 50 between which a field core 52 is clamped by a pair of bolts 54 and 56. The core 52, as shown in FIGURE 2, is formed of a pair of E-cores 58 and 60 which are constructed of laminated electrical sheet steel, the lamination being secured together by suitable fasteners at the corners of the E-cores. The E-core 58 has its outer legs terminating respectively in projections 62 and 64 and the E-core 60 has its outer legs terminating respectively in projections 66 and 68. The projections 62 and 66 fit together and the projections 64 and 68 fit together to form elongated lap joints of minimum reluctance in the magnetic circuit. The center legs of the E-cores constitute the pole pieces 70 and 72 which terminate in opposed circular pole faces 74 and 76 which embrace substantially half the circumferential length of a rotor 78. The pole piece 70 is formed with a bridge 71 which extends into engagement with pole piece 72 and similarly, the pole piece 72 is formed with a bridge 73 which extends into engagement with pole piece 70. The bridges 71 and 73 are of relatively thin cross-section so that they will saturate when the motor is energized but they serve to avoid an abrupt change in the flux density at the pole tip by providing a flux path from the poles to the rotor in the region between adjacent poles. The motor is provided with windings 80 and 82 on the pole pieces 70 and 72 respectively. Each of the windings 80 and 82 include a field coil and a feedback coil as described with reference to FIGURE 1. The pole piece 70 is provided with a pair of shading coils 84 and similarly, the pole piece 72 is provided with a pair of shading coils 86.

The rotor 78 of squirrel cage construction is provided with a shaft 88 which is supported for rotation in the end plates 48 and 50 by self-aligning bearings 90 and 92 respectively. A pair of transistors 94 and 96, which are connected in the oscillator circuit as described with reference to transistors 26 and 28 in FIGURE 1, are mounted on the bracket 98 which is secured to the end plate 50 at one end and to the fuel tank 44 at the other end to provide for good heat dissipation.

The fuel pump includes a pump rotor 100 which is mounted on the rotor shaft 88 for rotation within a chamber 102 in the end plate 48. A cover plate 104 is secured to the end plate 48 and includes a pump inlet passage 106 which is disposed coaxially of the pump rotor and which is covered by a filter 108. The pump is provided with an outlet passage 110 through the end plate 48 which is connected through a rigid conduit 112 and a flexible conduit 114 to a fitting 116 mounted on the fuel tank and adapted to receive the engine fuel line.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. In combination, an electric motor having a magnetic circuit including a stator and a rotor with an air gap therebetween, an electric circuit including a pair of field coils on said stator, a pair of transistors having input electrodes and output electrodes, a direct voltage source, each of said field coils being connected in series with said voltage source through the output electrodes of a corresponding one of the transistors, a pair of feedback coils on said stator inductively coupled with the field coils, each of the feedback coils being the sole source of switching voltage for a corresponding one of the transistors and being connected in regenerative relation with the input electrodes thereof and adapted to drive it into its current saturation region when it is switched conductive and the other transistor is switched non-conductive, the magnetic circuit being proportioned so that it is magnetized to a point below the knee of its magnetization curve by the saturation current of either transistor whereby the magnetic flux linking the feedback coils approaches a limiting value during the conductive interval of each transistor to cause the feedback voltage to decrease and reverse polarity to switch the conductive transistor into non-conduction and the non-conductive transistor into conduction over repeated cycles to produce an alternating magnetomotive force in said magnetic circuit to energize said rotor.

2. In combination, an electric motor having a magnetic circuit including a stator and a rotor with an air gap therebetween, an electric circuit including a pair of field coils on said stator, a pair of transistors having input electrodes and output electrodes, a direct voltage source, each of said field coils being connected in series with said voltage source through the output electrodes of a corresponding one of the transistors, a pair of feedback coils on said stator inductively coupled with field coils, each of the feedback coils being the sole source of switching voltage for a corresponding one of the transistors and being connected in regenerative relation with the imput electrodes thereof and having a turns ratio with the field coils so that the feedback voltage is sufficient to drive one transistor into collector current saturation and to drive the other into collector current cut-off whereby the current saturation causes the magnetic flux linking the feedback winding to approach a limiting value during the conductive interval of each transistor and thereby cause the feedback voltage to decrease reverse polarity to switch the transistors alternately conductive and non-conductive over repeated cycles to produce an alternating magnetomotive force in said magnetic circuit whereby starting torque may be developed by said rotor.

3. In combination, an induction motor having a magnetic circuit including a stator and a rotor with an air gap therebetween, an electric circuit including a pair of field coils on said stator, a pair of transistors having input electrodes and output electrodes, a direct voltage source, each of said field coils being connected in series with said voltage source through the output electrodes of a corresponding one of the transistors, a pair of feedback coils on said stator inductively coupled with the field coils, each of the feedback coils being the sole source of switching voltage for a corresponding one of the transistors and being connected in regenerative relation with the input electrodes thereof whereby one transistor becomes conductive when the other transistor becomes non-conductive, the magnetic circuit of the stator including at least one pair of poles, the feedback coils and field coils having a turns ratio proportioned so that the feedback voltage will drive one transistor into collector current saturation and the other into collector current cut-off so that the magnetic flux linking the feedback coils approaches a limiting value during the conductive interval of each transistor to cause the feedback voltage to decrease and reverse polarity to switch the transistors alternately conductive and non-conductive over repeated cycles to produce an alternating magnetomotive force in said magnetic circuit to energize said rotor.

4. In combination, an electric motor having a magnetic circuit including a stator and a rotor, said stator including a pair of E-shaped cores having their corresponding outer legs connected together and having their center legs disposed on opposite sides of said rotor and constituting a pair of oppositely disposed poles, each of said poles having arcuate pole faces spaced from the rotor by an air gap and terminating in pole tips, an electric circuit including a pair of field coils, a magnetic bridge extending between each pair of adjacent pole tips and being of small cross section relative to the cross section of said poles so that it is magnetically saturated when the field coils are energized, a pair of transistors having input electrodes and output electrodes, a direct voltage source, each of said field coils being connected in series with said voltage source through the output electrodes of a corresponding one of the transistors, a pair of feedback coils inductively coupled with the field coils, each of the feedback coils being the sole source of switching voltage for a corresponding one of the transistors and being connected in regenerative relation with the input electrodes thereof, one of the field coils and one of the feedback coils being disposed over one of said poles and the other field coil and the other feedback coil being disposed over the other of said poles, each feedback coil having a turns ratio with the corresponding field coil so that the feedback voltage will drive the conductive transistor into collector current saturation causing the feedback voltage to decrease and reverse its polarity to switch the other transistor into conduction to produce an alternating magnetomotive force in said magnetic circuit.

5. In combination, an induction motor having a magnetic circuit including a stator and a rotor with an air gap therebetween, an electric circuit including a pair of field coils on said stator, a pair of transistors having input electrodes and output electrodes, a direct voltage source, each of said field coils being connected in series with said voltage source through the output electrodes of a corresponding one of the transistors, a pair of feedback coils on said stator inductively coupled with the field coils, means for applying a forward bias voltage to the input electrodes of one of the transistors to cause it to become conductive whereby a feedback voltage is developed in the feedback coils, each feedback coil being the sole source of switching voltage for a corresponding one of the transistors and being connected in regenerative relation with the input electrodes thereof, each feedback coil having a turns ratio with one of the field coils so that the feedback voltage will drive the corresponding transistor into collector current saturation causing the feedback voltage to decrease and reverse its polarity to switch the other transistor into conduction to produce a alternating magnetomotive force in said magnetic circuit, said rotor being of squirrel cage construction, said stator including at least one pair of poles, and a shading coil on each pole whereby torque is developed by said rotor at standstill.

6. In combination, an induction motor having a magnetic circuit including a stator and a rotor with an air gap therebetween, an electric circuit including a pair of field coils on said stator, a pair of transistors each having emitter, base, and collector electrodes, a direct voltage source, each of said field coils being connected in series with said voltage source across the emitter and collector electrodes of a corresponding transistor, a pair of feedback coils on said stator inductively coupled with the field coils, means for applying a forward bias voltage between the emitter and base electrode of one of the transistors to cause it to become conductive whereby a feedback voltage is developed in the feedback coils, each feedback coil being the sole source of switching voltage for a corresponding one of the transistors and being connected in regenerative relation between the emitter and base electrodes thereof, each feedback coil having a turns ratio with one of the field coils so that the feedback voltage will drive the corresponding transistor into collector current saturation causing the feedback voltage to decrease and reverse its polarity to switch the other transistor into conduction to produce an alternating magnetomotive force in the magnetic circuit, said rotor being of squirrel cage construction, the magnetic circuit of the stator including a pair of poles, and a shading coil on each pole whereby torque is developed by said rotor at a standstill.

References Cited in the file of this patent

UNITED STATES PATENTS

| | | |
|---|---|---|
| 2,025,817 | Lanz | Dec. 31, 1935 |
| 2,064,090 | Sullivan et al. | Dec. 15, 1936 |
| 2,786,972 | Dreier et al. | Mar. 26, 1957 |
| 2,810,843 | Granqvist | Oct. 22, 1957 |
| 2,814,769 | Williams | Nov. 26, 1957 |
| 2,994,026 | Sampietro et al. | July 25, 1961 |
| 2,995,690 | Lemon | Aug. 8, 1961 |
| 3,067,370 | Quittner | Dec. 4, 1962 |
| 3,083,326 | Deming | Mar. 26, 1963 |

UNITED STATES PATENT OFFICE
CERTIFICATE OF CORRECTION

Patent No. 3,171,072                                    February 23, 1965

Samuel E. Adair

It is hereby certified that error appears in the above numbered patent requiring correction and that the said Letters Patent should read as corrected below.

Column 5, line 42, for "imput" read -- input --; line 50, after "decrease" insert -- and --; column 6, line 60, for "a" read -- an --.

Signed and sealed this 27th day of July 1965.

(SEAL)
Attest:

ERNEST W. SWIDER                                    EDWARD J. BRENNER
Attesting Officer                                       Commissioner of Patents